US005758691A

United States Patent [19]

Nedderman, Jr.

[11] Patent Number: 5,758,691

[45] Date of Patent: Jun. 2, 1998

[54] SELF-SEALING MIXING VALVE

[75] Inventor: William H. Nedderman, Jr., Middletown, R.I.

[73] Assignee: The United States of America as represented by the Secretary of the Navy, Washington, D.C.

[21] Appl. No.: 636,998

[22] Filed: Apr. 17, 1996

[51] Int. Cl.[6] ........ F16K 5/00

[52] U.S. Cl. ........ 137/895; 137/893; 137/896

[58] Field of Search ........ 137/897, 605, 137/893, 895, 509; 417/190; 132/896

[56] References Cited

U.S. PATENT DOCUMENTS

| | | | |
|---|---|---|---|
| 1,361,260 | 12/1920 | Hunt | 137/897 |
| 1,914,905 | 6/1933 | Barber | 137/605 |
| 3,568,888 | 3/1971 | Baldoni et al. | 137/605 |
| 4,549,813 | 10/1985 | Volz et al. | 137/897 |
| 5,427,151 | 6/1995 | Pauley | 137/895 |
| 5,622,203 | 4/1997 | Givler et al. | 137/895 |
| 5,685,342 | 11/1997 | Ekholm | 137/605 |

FOREIGN PATENT DOCUMENTS

| | | | |
|---|---|---|---|
| 2931-739 | 2/1981 | Germany | 137/605 |
| 197708 | 8/1977 | U.S.S.R. | 137/897 |

*Primary Examiner*—Denise L. Ferensic
*Assistant Examiner*—Joanne Y. Kim
*Attorney, Agent, or Firm*—Michael J. McGowan; Robert W. Gauthier; Prithvi C. Lall

[57] ABSTRACT

A self-sealing venturi type mixing valve for mixing a polymer with water as it is being dispensed. A hollow piston is slidably mounted in the valve body. Water flows through the piston and into a venturi tube causing the water flow to become turbulent. A circumferential slot connected to a polymer reservoir surrounds the downstream end of the piston. The piston is spring-loaded within the valve such that its downstream end seals against the portion of the valve body forming the throat of the venturi tube, also sealing the slot from the venturi tube. When polymer flow is started, the pressure of the polymer pushes the piston away from the throat, allowing polymer to flow into the tube and mix with the water. When the polymer flow is shut off, the spring-loaded piston closes off the slot. Any polymer remaining in the slot is sealed off from contact with water, thus preventing clogging of the valve. The travel of the piston, and thus the size of the slot opening, can be changed by adjusting the location of the piston stop.

10 Claims, 2 Drawing Sheets

SELF-SEALING MIXING VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to mixing valves and more particularly to self-sealing mixing valves for mixing a polymer with water as it is being dispensed. The self-sealing valve has a spring-loaded piston through which water passes. The spring-load on the piston seals the polymer inlet. When the polymer is pressurized to commence flow, the pressure of the polymer against the piston valve overcomes the spring-load and opens the polymer inlet, allowing the polymer to flow into the valve and mix with the water flowing through the piston. When the polymer flow is shut off and the pressure decreased, the spring-loaded piston closes off the polymer inlet. Any polymer remaining in the valve body is sealed off from contact with water, thus preventing clogging of the valve.

(2) Description of the Prior Art

In a system for reducing drag on an underwater vehicle, polymer is ejected near the forward end of the vehicle. The polymer is normally stored in a highly concentrated state and is mixed with water in a mixing valve prior to being ejected. Prior art mixing valves typically consist of a circumferential slot surrounding a venturi tube. Water is passed through the venturi tube and polymer is injected into the slot. The turbulence of the water as it leaves the tube serves to mix the water with the surrounding polymer forming a slurry. The slurry is then ejected around the nose of the vehicle.

One problem with prior art valves is that residual polymer remains in the valve when the polymer flow is shut off. The residual polymer tends to harden when exposed to water such that the circumferential slot in the valve becomes clogged. Some prior art valves are designed to be disassembled such that the residual polymer can be cleaned from the valve. However, these valves must be disassembled and cleaned after each use.

Another problem with the design of prior art valves is that the size of the circumferential slot is fixed. In experiments to determine maximum drag reduction, various polymers and various mixes of polymer and water are tried. The size of the circumferential slot determines the amount of polymer mixed with the water. In order to vary the size of the slot in a series of experiments using prior art valves, the valve must be removed from the vehicle and replaced with a valve having the correct slot size.

SUMMARY OF THE INVENTION

Accordingly, it is a general purpose and object of the present invention to provide a self-sealing mixing valve that prevents clogging caused by hardening of residual polymer in the valve and eliminates the need to clean the valve after each use.

It is a further object that the valve have an adjustable circumferential slot size for testing various polymer mixes.

These objects are accomplished with the present invention by providing a venturi type mixing valve used for mixing polymer and water in a slurry. The valve is designed with a slidable hollow piston to provide a seal between the polymer and the water when the polymer flow is stopped. The hollow piston is spring-loaded with the downstream end of the piston forming a seal against the throat of the venturi tube. A circumferential slot surrounds the downstream end of the piston. Water flows through the piston and into the venturi tube. When polymer flow is started, the pressurized polymer enters into the slot and pushes against the piston. The piston moves away from the throat end of the venturi tube allowing the polymer to pass through the slot, enter the tube and mix with the water. An adjustable stop limits the travel of the tube and controls the size of the slot opening. When polymer flow is stopped, the spring-load on the piston seals the piston against the throat, sealing off the circumferential slot from the venturi tube. Polymer remaining in the circumferential slot is sealed off from contact with water, thus preventing clogging of the valve. Any polymer remaining downstream of the throat is mixed with the water and washed from the valve.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
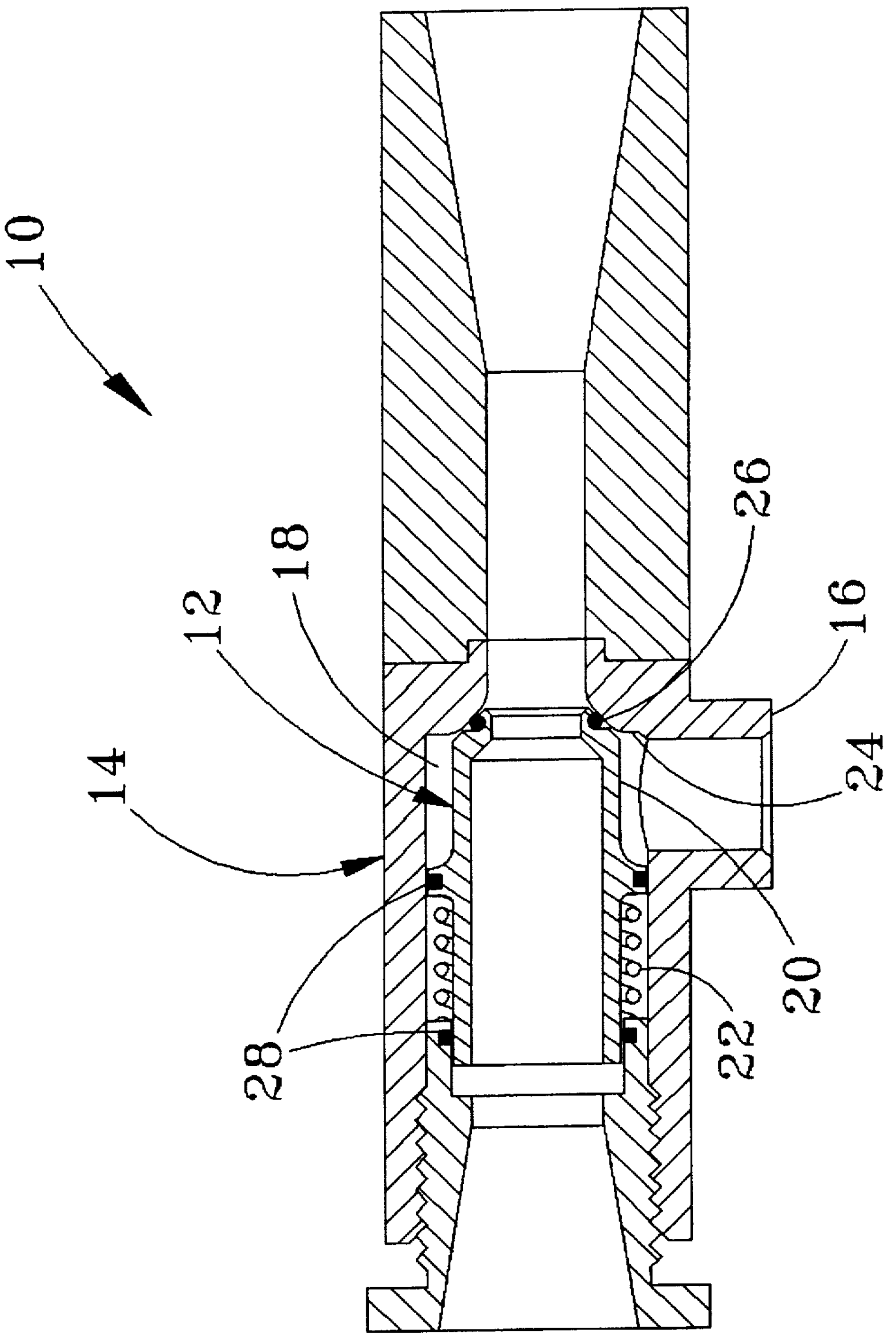
FIG. 1 shows a sectional view of a self-sealing mixing valve in the sealed position.

Referring now to FIG. 1, there is shown in cross section a self-sealing mixing valve 10 having a hollow piston 12 within cylindrical valve body 14 and a polymer inlet conduit 16 connected to a circumferential slot 18 surrounding downstream end 20 of hollow piston 12. Piston 12 is an open, hollow cylinder, slidably mounted within and along the axis of valve body 14. Spring 22 surrounds piston 12 and biases downstream end 20 against throat portion 24 of valve body 14. First o-ring 26 surrounds downstream end 20 and forms a seal between piston 12 and throat portion 24. Second o-rings 28 provide circumferential sealing between piston 12 and body 14.

Figure 2:
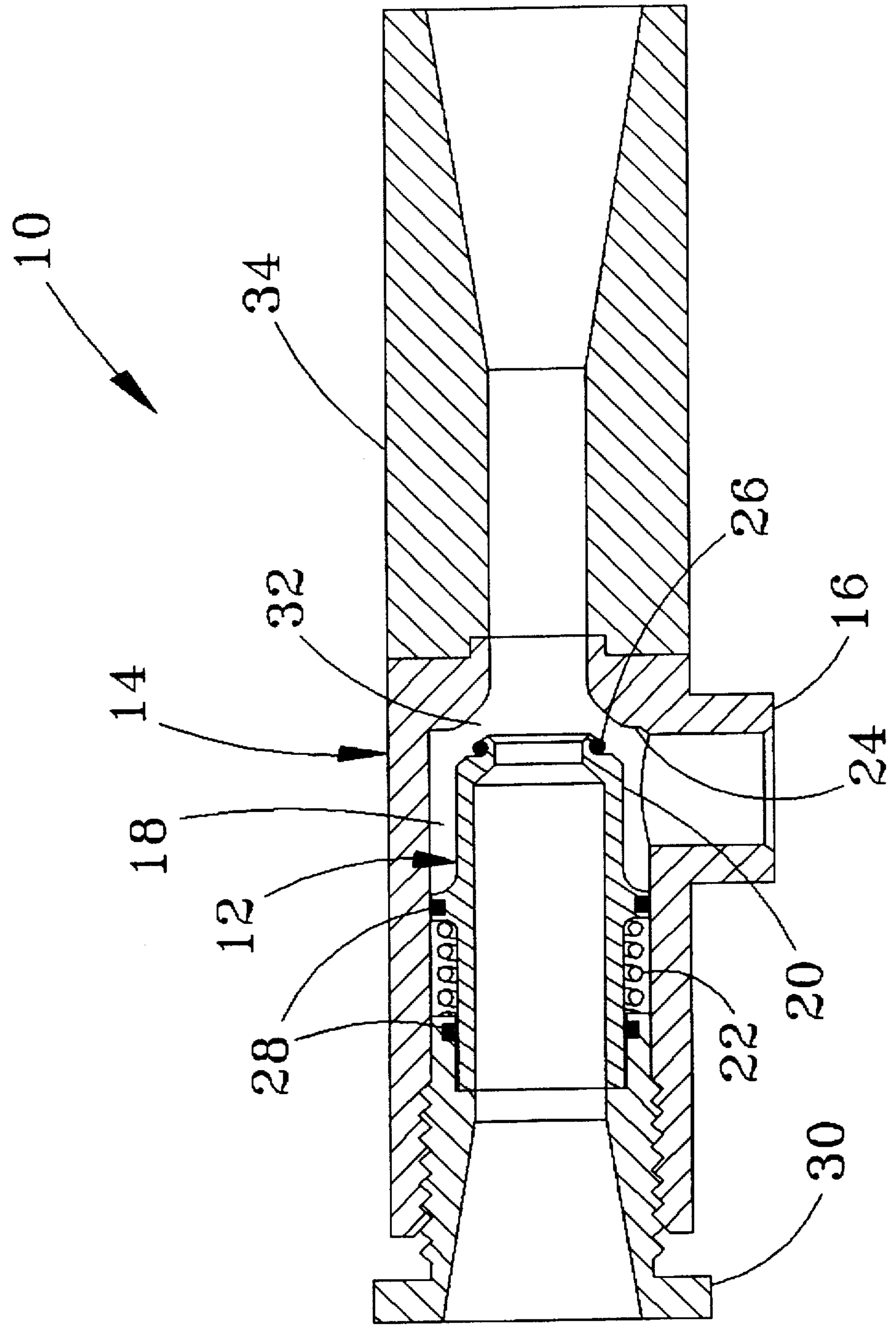
FIG. 2 shows a sectional view of a self-sealing mixing valve in the open position.

Referring now to FIG. 2, valve 10 is shown in an open position. When pressure is applied to start polymer flow from a reservoir (not shown) through conduit 16 and into slot 18, the polymer pushes against downstream end 20, forcing piston 12 away from throat portion 24. Tube 12 is stopped against shoulder piece 30. Shoulder piece 30 is threaded into valve body 14. Polymer flows from slot 18, through opening 32 between downstream end 20 and throat portion 24 and out through downstream casing 34 of valve 10. Water flows through piston 12 into casing 34. Casing 34 is in the shape of a venturi so as to create turbulent flow within casing 34. The turbulent flow within casing 34 causes mixing of the polymer and water. The size of opening 32 can be adjusted by threading shoulder piece 30 further into or out of body 14 to change the travel distance of piston 12 within body 14. When the polymer flow is stopped and the polymer no longer exerts pressure against downstream end 20, spring 22 again forces piston 12 against throat portion 24, closing opening 32 as shown in FIG. 1.

The self-sealing valve of the present invention has many advantages over the prior art. Polymer remaining within slot 18 when flow is stopped is sealed from contact with water by first o-ring 26. Any polymer remaining within casing 34 is mixed with the water and exits valve 10. The lack of polymer in contact with water within valve 10 prevents valve 10 from becoming clogged. Further, the easy adjustment of the size of opening 32 by threading shoulder piece 30 into or out of valve body 14 allows testing of various polymers, polymer flow rates and mixing ratios without time consuming changing of separate valves and without having a large inventory of valves on hand.

What has thus been described is a self-sealing venturi type mixing valve for mixing a polymer with water as it is being dispensed. When polymer flow is stopped, the valve provides a positive seal between the polymer and the water to prevent clogging of the valve. Water passes through a hollow piston slidably mounted within the valve and into a casing formed in the shape of a venturi tube. The piston is spring-loaded such that a downstream end of the piston seals against the valve body at the throat of the venturi tube. Polymer is injected into the valve through a conduit leading to a circumferential slot surrounding the downstream end of the piston. When the polymer is not pressurized, the seal between the piston and the body prevents the polymer from entering the venturi tube. When the polymer is pressurized, the polymer pushes against the downstream end of the piston. The piston moves against the spring bias and away from the throat. The piston movement away from the throat opens the circumferential slot to the venturi tube allowing polymer to flow into the tube and mix with the water flowing through the piston into the tube. The distance the piston moves away from the body is controlled by a stop which can be adjusted so as to adjust the size of the opening between the slot and the throat. When the polymer flow is shut off, the spring-loaded piston once more seals against the throat, closing off the circumferential slot. Any polymer remaining in the slot is sealed off from contact with water, thus preventing clogging of the valve.

Obviously many modifications and variations of the present invention may become apparent in light of the above teachings. For example, the valve can be used for mixing of other materials besides water and polymer, such as mixing of a two part epoxy. The shape of the flow passages in the valve body, piston and venturi tube casing can be changed to suit: the materials used. The movement of the piston away from the throat can also be controlled by a trigger mechanism, such that an operator can manually cut off the polymer flow.

In light of the above, it is therefore understood that within the scope of the appended claims, the invention may be practiced otherwise than as specifically described.

What is claimed is:

1. A valve for mixing an additive material into a liquid medium, the valve comprising:

a generally open, cylindrical valve body having a first inlet port end for receiving the liquid medium and a throat end, the inside diameter of the throat end being smaller than the inside diameter of the first inlet port end;

a venturi tube means for creating turbulent flow of the liquid medium, the tube means adjacent the throat end;

a generally open, cylindrical nozzle means located within the valve body for directing the liquid medium through the valve body and into the venturi tube means, the nozzle means having a first end adjacent to the first inlet port end and having a second end in proximity to the throat end, the inside diameter of the nozzle means being generally the same as the inside diameter of the throat end, the exterior diameter of the nozzle means being smaller than the inside diameter of the first inlet port end forming a circumferential cavity between the nozzle means and the valve body;

a biasing means for moving the nozzle means into sealing contact with the throat end of the valve body, the contact being sufficient to seal the circumferential cavity from the venturi tube means; and a second inlet port in fluid communication with the circumferential cavity for receiving the additive material, a fluid pressure of the additive material working against the biasing means to move the nozzle means away from the throat end of the valve body, the movement allowing fluid communication between the circumferential cavity and the venturi tube means, the turbulent flow in the venturi tube means causing the additive material and the liquid medium to mix, the biasing means moving the nozzle means back into sealing contact with the throat end when the additive fluid pressure is removed.

2. The valve according to claim 1 further comprising a stop means for limiting the movement of the nozzle means away from the throat end to a certain distance.

3. The valve according to claim 2 wherein the stop means further comprises an adjustment means for adjusting the distance of movement.

4. The valve of claim 3 wherein the adjustment means comprises mating threads on the stop means and the first inlet port end of the valve body, the threading of the stop means into the first inlet port end providing the adjustment of the distance of movement.

5. The valve according to claim 1 wherein the biasing means comprises a spring.

6. The valve according to claim 5 wherein:

the first inlet port end further comprises an interior flange;

the nozzle means further comprises an exterior flange, a surface of the flange nearer the second end of the nozzle means defining a downstream surface of the circumferential cavity furthest from the throat end; and the spring surrounds the nozzle means and extends between the interior flange and the exterior flange.

7. The valve of claim 6 wherein flange o-rings are incorporated into the interior flange and the exterior flange, the flange o-rings forming a seal between the nozzle means and the valve body.

8. The valve of claim 1 wherein the nozzle means further comprises a nozzle o-ring, the nozzle o-ring forming the sealing contact between the nozzle means and the throat end.

9. The valve according to claim 6 wherein the interior flange further comprises a stop means for limiting the movement of the nozzle means away from the throat end to a certain distance.

10. The valve according to claim 9 wherein the stop means further comprises an adjustment means for adjusting the distance of movement.

* * * * *